United States Patent
Shi et al.

(10) Patent No.: US 9,660,824 B2
(45) Date of Patent: May 23, 2017

(54) RENEWING AN IN-PROCESS MEETING WITHOUT INTERRUPTION IN A NETWORK ENVIRONMENT

(71) Applicant: CISCO TECHNOLOGY, INC., San Jose, CA (US)

(72) Inventors: Qi Shi, Suzhou (CN); Huahua Yin, Suzhou (CN); Yi Lu, Suzhou (CN); Hua Ouyang, Suzhou (CN); Yunwei Luo, Suzhou (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 227 days.

(21) Appl. No.: 14/036,679

(22) Filed: Sep. 25, 2013

(65) Prior Publication Data
US 2015/0085707 A1   Mar. 26, 2015

(51) Int. Cl.
*H04L 12/16*   (2006.01)
*H04L 12/18*   (2006.01)

(52) U.S. Cl.
CPC ...... *H04L 12/1831* (2013.01); *H04L 12/1818* (2013.01); *H04L 12/1822* (2013.01)

(58) Field of Classification Search
CPC ............. H04L 12/1827; H04L 41/0816; H04L 65/403; H04L 65/4015
USPC .................. 370/260, 270, 271; 709/204, 228
See application file for complete search history.

(56) References Cited

U.S. PATENT DOCUMENTS

| | | | |
|---|---|---|---|
| 6,789,064 B2 | 9/2004 | Koh | |
| 2002/0082907 A1 | 6/2002 | Inomata | |
| 2005/0027800 A1 | 2/2005 | Erickson | |
| 2006/0031326 A1 | 2/2006 | Ovenden | |
| 2007/0133438 A1* | 6/2007 | Shaffer et al. | 370/260 |
| 2009/0300520 A1* | 12/2009 | Ashutosh | H04L 12/1831 715/756 |
| 2011/0022968 A1* | 1/2011 | Conner et al. | 715/753 |

(Continued)

OTHER PUBLICATIONS

"Create a Collaborative and Productive Web Meeting Experience," Cisco WebEx Meetings Product Overview, Cisco, C78-707254-01, Aug. 2012; © 2012 Cisco and/or its affiliates. All Rights Reserved. 2 pages.

(Continued)

*Primary Examiner* — Shaq Taha
*Assistant Examiner* — Ryan Kavleski
(74) *Attorney, Agent, or Firm* — Patent Capital Group

(57) ABSTRACT

A method is provided in one example and includes establishing a connection with each of a first set of endpoints associated with meeting attendees, and establishing a first online meeting between the first set of endpoints associated with meeting attendees in which the first online meeting has a meeting identifier associated therewith. The method further includes receiving first context information associated with the first online meeting from at least one of the first set of endpoints associated with meeting attendees, and establishing a second online meeting between a second set of endpoints associated with meeting attendees without disconnecting at least one of the first set of endpoints associated with meeting attendees in which the second online meeting has the same meeting identifier as the first online meeting associated therewith. The method still further includes maintaining the first context information within the second online meeting.

19 Claims, 10 Drawing Sheets

(56) References Cited

U.S. PATENT DOCUMENTS

| | | | |
|---|---|---|---|
| 2011/0161654 A1* | 6/2011 | Margolis et al. | 713/150 |
| 2011/0305332 A1* | 12/2011 | Geppert et al. | 379/202.01 |
| 2012/0110475 A1* | 5/2012 | Han et al. | 715/753 |
| 2012/0150956 A1* | 6/2012 | Tucker | H04L 65/1069 709/204 |
| 2013/0038673 A1* | 2/2013 | Hiller et al. | 348/14.07 |
| 2013/0198288 A1* | 8/2013 | Jones | H04L 12/1831 709/204 |
| 2014/0099075 A1* | 4/2014 | Li | H04N 7/155 386/241 |

OTHER PUBLICATIONS

Barnes, M., et al., "A Framework for Centralized Conferencing," XCON Working Group, IETF Draft draft-ietf-xcon-framework-11, Apr. 11, 2008, 68 pages; http://tools.ietf.org/html/draft-ietf-xcon-framework-11.

* cited by examiner

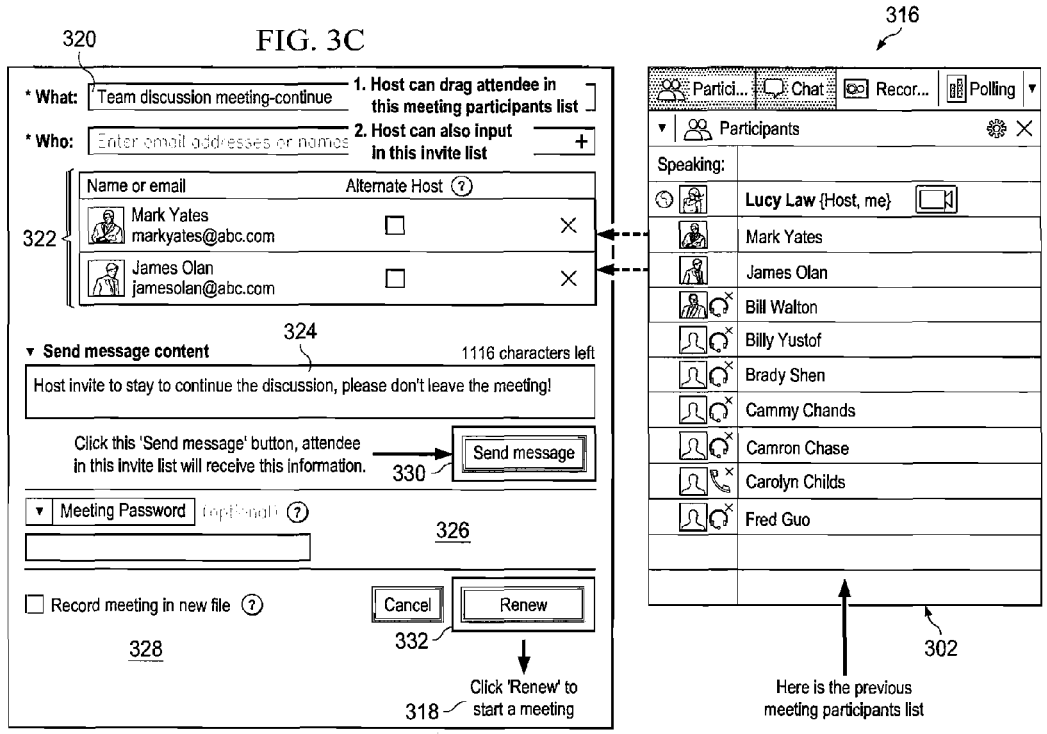

RENEWING AN IN-PROCESS MEETING WITHOUT INTERRUPTION IN A NETWORK ENVIRONMENT

TECHNICAL FIELD

This disclosure relates in general to the field of communications and, more particularly, to renewing an in-process meeting without interruption in a network environment.

BACKGROUND

In certain architectures, service providers and/or enterprises may seek to offer sophisticated online conferencing services for their end users. The conferencing architecture may offer an "in-person" meeting experience over a network. Conferencing architectures may also deliver real-time interactions between people using advanced visual, audio, and multimedia technologies. Virtual meetings and conferences have an appeal because they may be held without the associated travel inconveniences and costs. In addition, virtual meetings may provide a sense of community to participants who are dispersed geographically.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 3A-3E are illustrations showing example user interface representations associated with a meeting client according to at least one example embodiment;

DETAILED DESCRIPTION OF EXAMPLE EMBODIMENTS

Overview

A method is provided in one example and includes establishing a connection with each of a first set of endpoints associated with meeting attendees, and establishing a first online meeting between the first set of endpoints associated with meeting attendees in which the first online meeting has a meeting identifier associated therewith. The method further includes receiving first context information associated with the first online meeting from at least one of the first set of endpoints associated with meeting attendees, and establishing a second online meeting between a second set of endpoints associated with meeting attendees without disconnecting at least one of the first set of endpoints associated with meeting attendees in which the second online meeting has the same meeting identifier as the first online meeting associated therewith. The method still further includes maintaining the first context information within the second online meeting. In more particular embodiments, the method further includes generating a first recording file of the first online meeting, the first recording file having a first recording identifier associated therewith, and generating a second recording file of the second online meeting, the second recording file having a second recording identifier associated therewith. In still more particular embodiments, the method includes sending the second recording file to at least one of the second set of endpoints associated with meeting attendees.

Example Embodiments

Figure 1:
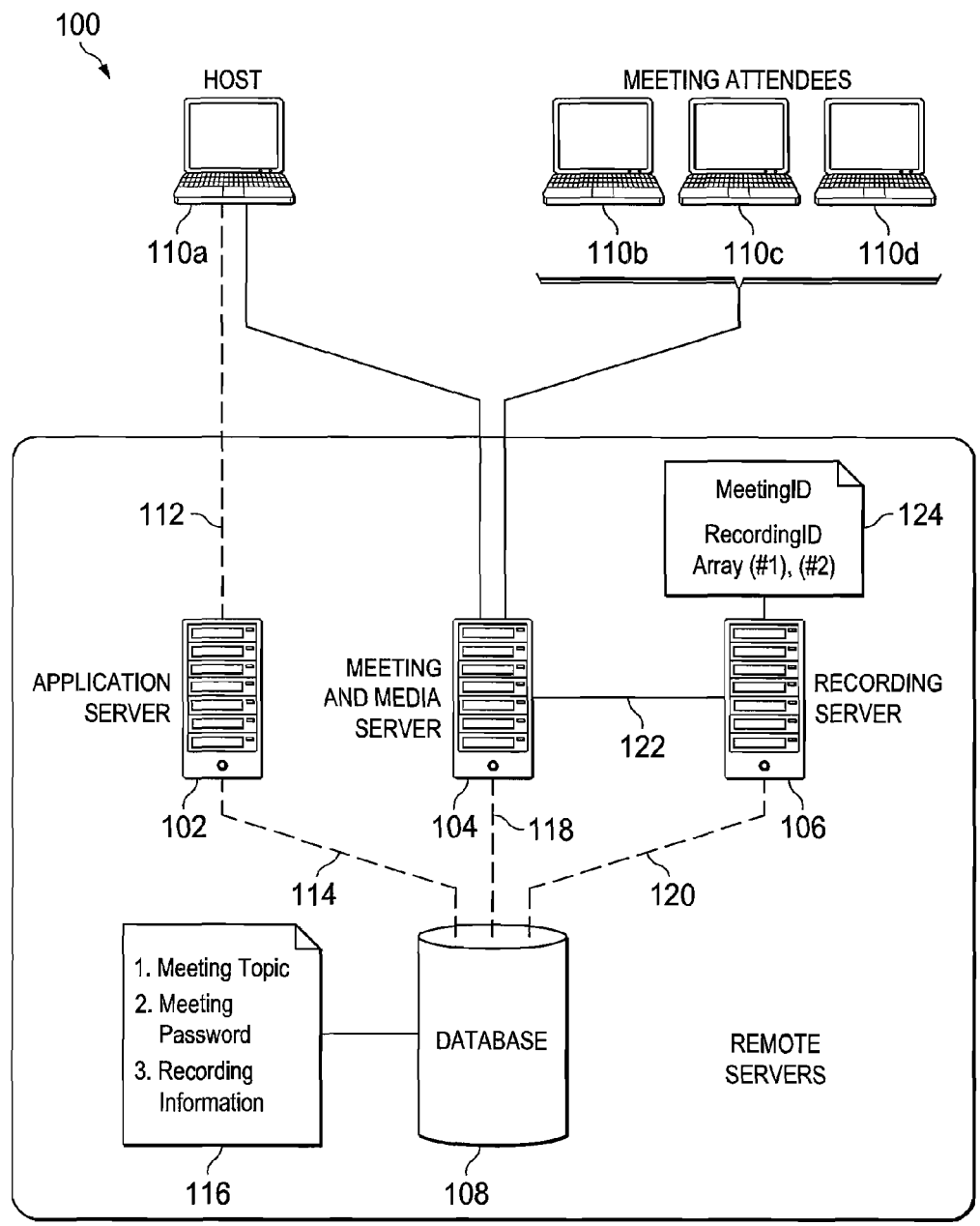
FIG. 1 is a simplified block diagram of a communication system for renewing an in-process meeting without interruption in a network environment.

Turning to FIG. 1, FIG. 1 is a simplified block diagram of a communication system 100 for renewing an in-process meeting without interruption in a network environment. Communication system 100 of FIG. 1 includes an application server 102, a meeting and media server 104, a recording server 106, and a database server 108. In accordance with various embodiments, one or more of application server 102, meeting and media server 104, recording server 106, and database server 108 are in communication with one another via one or more networks. Communication system 100 further includes a first client device 110a, a second client device 110b, a third client device 110c, and fourth client device 110d. One or more of first client device 110a, second client device 110b, third client device 110c, and fourth client device 110d are configured to be in communication with one or more of application server 102 and meeting and media server 104 via one or more networks. In particular embodiments the one or more networks may include the Internet, a local area network (LAN), a wide area network (WAN), or any other suitable communication network.

In one particular instance, communication system 100 can be associated with a service provider digital subscriber line (DSL) deployment. In other examples, communication system 100 would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 100 may include a configuration capable of transmission control protocol/internet protocol (TCP/IP) communications for the transmission and/or reception of packets in a network. Communication system 100 may also operate in conjunction with a user datagram protocol/IP (UDP/IP) or any other suitable protocol, where appropriate and based on particular needs.

Online meeting services provide convenient communication tools allowing meeting attendees to interact and provide information to one another without requiring the attendees to be located in the same physical location. As a result, online meeting services have become very popular and are extremely important, especially for companies and other work environments. In current online meeting systems, a meeting host frequently completes a current meeting, but may desire for some reason to keep discussing aspects of the meeting with only some of the attendees of the current meeting. In order to accomplish this task, the host typically must end the current meeting and start another meeting with some attendees.

For example, a meeting host of a current meeting may wish to continue meeting with some of the attendees, such as team managers to discuss one or more some high level topics, while requiring other attendees of the current meeting to leave the continuing meeting. However, if the host must ask some of the attendees to leave the current meeting to allow remaining attendees to continue the meeting, the situation may become awkward. In addition, when a meeting host wishes to continue talking with team managers, team members may still be allowed to join the meeting again using the meeting Uniform Resource Locator (URL) which may be undesirable. For the confidentiality requirements, a meeting host may be required to pause or stop a meeting recording functions to prevent the subsequent meeting from being appended to the recorded content from the first meeting. as same as previous recording file so that the subsequent content is not made available to the attendees of the previous meeting.

In addition, in current meeting service implementations, if a host is required to set up a new meeting in order to continue discussions with the remaining attendees, all previous meeting context and/or information such as instant messages, whiteboard content, and other shared information will be lost and therefore not available for the subsequent meeting such that it may not be convenient to even continue the previous discussion.

For one or more of the above reasons, a common process mode to continue a previous meeting with a subset of the attendees is that host schedules a new meeting and invites these attendees one by one, which is wasteful and inconvenient. Alternatively, a host may wait until unwanted attendees have left the meeting and continue the in-process meeting, However, the meeting recording cannot be split from the previous meeting content, and the meeting password will be the same as the password for the old meeting. This may cause security issues since old meeting attendees can join the meeting again using old join link and password. In addition, old attendees maybe be confused if the meeting has not yet ended.

Thus, requiring a meeting host to start a new meeting to continue a previous meeting with a subset of attendees may result in a number of disadvantages such as requiring attendees to quit the old meeting and to join new meeting again which wastes time for attendees by requiring the old meeting to be stopped and waiting to join a new meeting. In addition, restarting a meeting requires time for a meeting client to connect to the remote server providing the meeting services. In addition, the host needs to spend time to re-invite attendees to the new meeting through email or some other manner. Perhaps most importantly, if a new meeting is started, previous meeting information such as whiteboards and other meeting context will be lost, making it inconvenient to continue the previous discussion.

Various embodiments described herein allow a host to simply continue a meeting without worrying about unwanted participants or mixing of the meeting recording file and allowing host and current participants to still access previous meeting context information such as chat information, whiteboard information, other types of content shared between meeting participants and other meeting context for the renewed meeting.

Figure 2A:
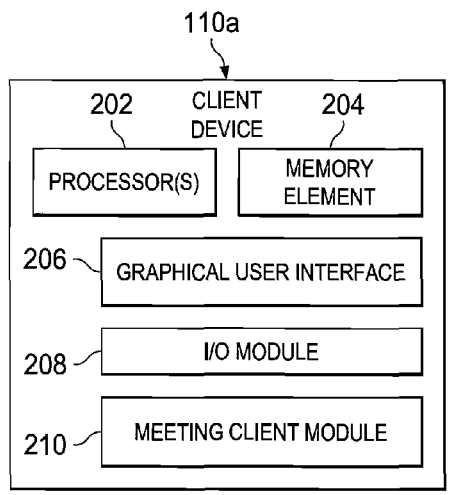
FIG. 2A illustrates a simplified block diagram of an embodiment of a client device of the communication system of FIG. 1.

FIG. 2A illustrates a simplified block diagram of an embodiment of client device 110*a* of FIG. 1. Client device 110*a* includes processor(s) 202, memory element 204, graphical user interface (GUI) 206, input/output (I/O) module 208, and meeting client module 210. Processor(s) 202 is configured to execute various tasks of client device 110*a* as described herein and memory element 204 is configured to store data associated with client device 110*a*. GUI 206 is configured to provide a graphical user interface to allow user interaction with meeting client software during an online meeting. I/O module 208 is configured to receive communications from and send communications to other devices or software modules such as application server 102, meeting and media server 104, or client devices 110*b*-110*d*. Meeting client module 210 is configured to provide a meeting client to provide meeting services to allow a user of client device 110*a* to interact with meeting attendees such as exchanging video, audio, and other meeting data as further described herein.

In one implementation, client device 110*a* is a network element that includes software to achieve (or to foster) the meeting client operations as outlined herein in this Specification. Note that in one example, each of these elements can have an internal structure (e.g., a processor, a memory element, etc.) to facilitate some of the operations described herein. In other embodiments, these meeting client operations may be executed externally to this element, or included in some other network element to achieve this intended functionality. Alternatively, client device 110*a* may include software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof. In various embodiments, each of client devices 110*b*-110*d* may be configured in a similar manner to that of client device 110*a*.

Figure 2B:
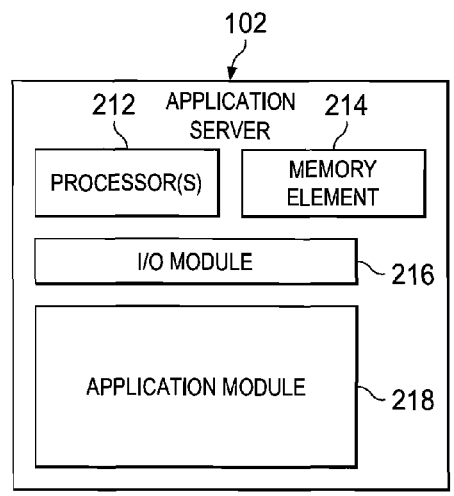
FIG. 2B illustrates a simplified block diagram of an embodiment of an application server of the communication system of FIG. 1.

FIG. 2B illustrates a simplified block diagram of an embodiment of application server 102 of FIG. 1. Application server 102 includes processor(s) 212, memory element 214, input/output (I/O) module 216, and application module 218. Processor(s) 202 is configured to execute various tasks of application server 102 as described herein and memory element 214 is configured to store data associated with application server 102. I/O module 218 is configured to receive communications from and send communications to other devices or software modules such as client devices 110*a*-110*d*, meeting and media server 104, or database 108. Application module 218 is configured to provide one or more applications to facilitate the providing of online meeting services to one or more users of client devices 110*a*-110*d* such as scheduling one or more online meetings and receiving meeting information such as topics, and meeting passwords, exchanging other meeting data, and performing various functions of application server 102 as further described herein.

In one implementation, application server 102 is a network element that includes software to achieve (or to foster) the meeting services operations as outlined herein in this Specification. Note that in one example, each of these elements can have an internal structure (e.g., a processor, a memory element, etc.) to facilitate some of the operations described herein. In other embodiments, these meeting service operations may be executed externally to this element, or included in some other network element to achieve this intended functionality. Alternatively, application server 102 may include software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 2C:
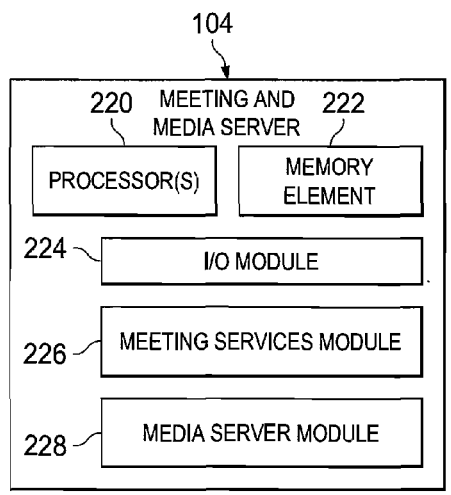
FIG. 2C illustrates a simplified block diagram of an embodiment of a meeting and media server of the communication system of FIG. 1.

FIG. 2C illustrates a simplified block diagram of an embodiment of meeting and media server 104 of FIG. 1. Meeting and media server 104 includes processor(s) 220, memory element 222, input/output (I/O) module 224, meeting services module 226, and media server module 228. Processor(s) 220 is configured to execute various tasks of a meeting and media server 104, as described herein, and memory element 214 is configured to store data associated with meeting and media server 104. I/O module 224 is configured to receive communications from and send communications to other devices or software modules such as client devices 110a-110d, recording server 106, or database 108. Meeting services module 226 is configured to provide one or more online meeting services to one or more users of client devices 110a-110d such as whiteboard and chat functions as further described herein. Media server module 228 is configured to facilitate the exchange of media information, such as video and/or audio, between meeting participants.

In one implementation, meeting and media server 104 is a network element that includes software to achieve (or to foster) the media and meeting services operations as outlined herein in this Specification. Note that in one example, each of these elements can have an internal structure (e.g., a processor, a memory element, etc.) to facilitate some of the operations described herein. In other embodiments, these meeting service operations may be executed externally to this element, or included in some other network element to achieve this intended functionality. Alternatively, meeting and media server 104 may include software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 2D:
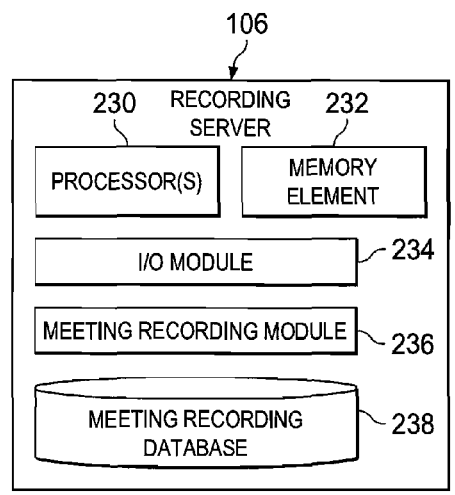
FIG. 2D illustrates a simplified block diagram of an embodiment of a recording server of the communication system of FIG. 1.

FIG. 2D illustrates a simplified block diagram of an embodiment of recording server 106 of FIG. 1. Recording server 106 includes processor(s) 230, memory element 232, input/output (I/O) module 234, meeting recording module 236, and meeting recording database 238. Processor(s) 230 is configured to execute various tasks of recording server 106 as described herein and memory element 232 is configured to store data associated with recording server 106. I/O module 234 is configured to receive communications from and send communications to other devices or software modules such as meeting and media server 104 or database 108. Meeting recording module 236 is configured to record an online meeting between meeting participants and store the one or more recorded meetings in meeting recording database 238 as further described herein.

In one implementation, recording server 106 is a network element that includes software to achieve (or to foster) the meeting recording operations as outlined herein in this Specification. Note that in one example, each of these elements can have an internal structure (e.g., a processor, a memory element, etc.) to facilitate some of the operations described herein. In other embodiments, these meeting recording operations may be executed externally to this element, or included in some other network element to achieve this intended functionality. Alternatively, recording server 106 may include software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Referring again to FIG. 1, in a particular example, a meeting host associated with first client device 110a initiates an online meeting by accessing application server 102 to schedule the online meeting, enter a meeting topic, assign a meeting password, and/or designate one or more meeting attendees. In addition, the meeting host may indicate whether the meeting is to be recorded. Alternately, the meeting host may choose to initiate recording of the meeting during progress of the meeting.

Application server 102 may then send meeting invitations to each of the invited meeting attendees. In a particular embodiment, application server 102 may send meeting invitations to each of the meeting attendees by sending an electronic mail to a network address associated with each of the meeting attendees. Application server 102 may further store meeting information associated with the scheduled meeting in meeting information database 108. In particular embodiments, the meeting information may include one or more of a meeting identifier (ID) associated with the meeting, meeting topic information, a meeting password, invited meeting attendees information, and recording information associated with the online meeting.

At the time of the scheduled meeting, the meeting host and one or more meeting attendees may connect to meeting and media server 104 using one or more of client devices 110a-110d. During the online meeting, meeting and media server 104 is configured to provide meeting and media services to allow meeting attendees to communicate with one another using audio and/or video communication. Meeting and media server 104 may be further configured to allow meeting attendees to exchange additional information such as instant messages, whiteboard content, and other shared information The shared information may form at least a portion of the context of the meeting.

If the host has previously designated that the online meeting is to be recorded, or if the host designates that the meeting is to be recorded during the progress of the meeting, recording server 106 creates a recording ID, begins recording online meeting record information received from meeting and media server 104, and stores the recorded online meeting record information within meeting recording database 238 in association with the meeting ID and a recording ID. In a particular embodiment, recording server 106 stores the meeting recording information within a recording array list including one or more arrays associated with the recording ID. In one or more embodiments, the online meeting record information is stored within one or more files. The online meeting record information may include any audio, video, whiteboard, chat, or any other context information exchanged by the attendees during the progress of the meeting.

When the host wishes to end the current meeting but still continue discussions with a subset of the attendees, the host may select an option within the meeting client of first client device 110a to send an indication to application server 102 to initiate a renewal of the meeting with specified attendees without requiring the specified attendees to exit or disconnect from the concluded meeting. In one or more embodiments, a meeting password, recording file, and/or attendees for the subsequent meeting are updated such that they different from those of the previous meeting. In various embodiments, the meeting host does not need to exit the old meeting to start a new meeting. In one or more embodiments, the meeting host does not need to send meeting invitation to attendees of the subsequent meeting again. In various embodiments, the meeting recording and a link to join the meeting are changed from those of the previous meeting in order to maintain the security of the subsequent meeting.

During the setup of the renewed meeting, the meeting client of the meeting host may maintain a connection to meeting and media server 104 so that the meeting host may continue interacting with meeting attendees. While the connection is maintained, the meeting client may further send an indication to application server 102 of a new password for the renewed meeting and/or an indication that the renewed meeting is to be recorded as further described herein.

In an example operation of communication system 100, in which the host of a meeting wishes to renew the meeting for a subset of the original meeting attendees, the meeting client of first client device 110*a* sends updated meeting information within a meeting update message 112 to application server 102. The updated meeting information may include one or more of an updated meeting topic, a new meeting password, an updated list of meeting attendees, and recording options for the renewed meeting. Application server 102 then sends the updated meeting information to database 108 within a meeting update message 114. Database 108 then stores the updated meeting information within a meeting information file 116. Database 108 then notifies one or more other servers regarding the updated meeting information. In particular embodiments, database 108 may notify the one or more other servers through an event bus. In at least one embodiment, database 106 may notify meeting and media server 104 regarding one or more meeting setting changes such as the updated topic or new password for the subsequent meeting using a meeting update message 118. In some embodiments, database 106 may notify recording server 106 of updated meeting recording information via a meeting recording update message 120. In a particular embodiment, if there is a need to generate a new recording file for the subsequent meeting, database 106 notifies recording server 106 to bind a new recording file having a new recording ID to the current meeting.

During the process, first client device 110*a* of the meeting host maintains a connection with meeting and media server 104. In at least one embodiment, the meeting ID associated with the meeting remains unchanged from that of the first meeting to facilitate meeting data synchronization. In addition, one or more meeting attendees associated with one or more of client devices 110*b*-110*d* do not exit the meeting and remain connected to meeting and media server 104 such that the end of the current meeting and the beginning of the subsequent meeting is seamless to the attendees.

In one or more embodiments, recording server 106 receives meeting content 122 from meeting and media server 104 and records the meeting content in a meeting recording file. In a particular embodiment, recording server 106 binds a new recording file to the meeting by adding the new recording file to an existing recording array list 124. After the renewed meeting ends, the meeting host may receive two or more recording files and the host may choose to provide the recording files to different meeting participants.

FIGS. 3A-3E are illustrations showing example user interface representations associated with a meeting client according to at least one example embodiment. The representations of FIGS. 3A-3E are merely examples and do not limit the claims in any way.

Figure 3A:
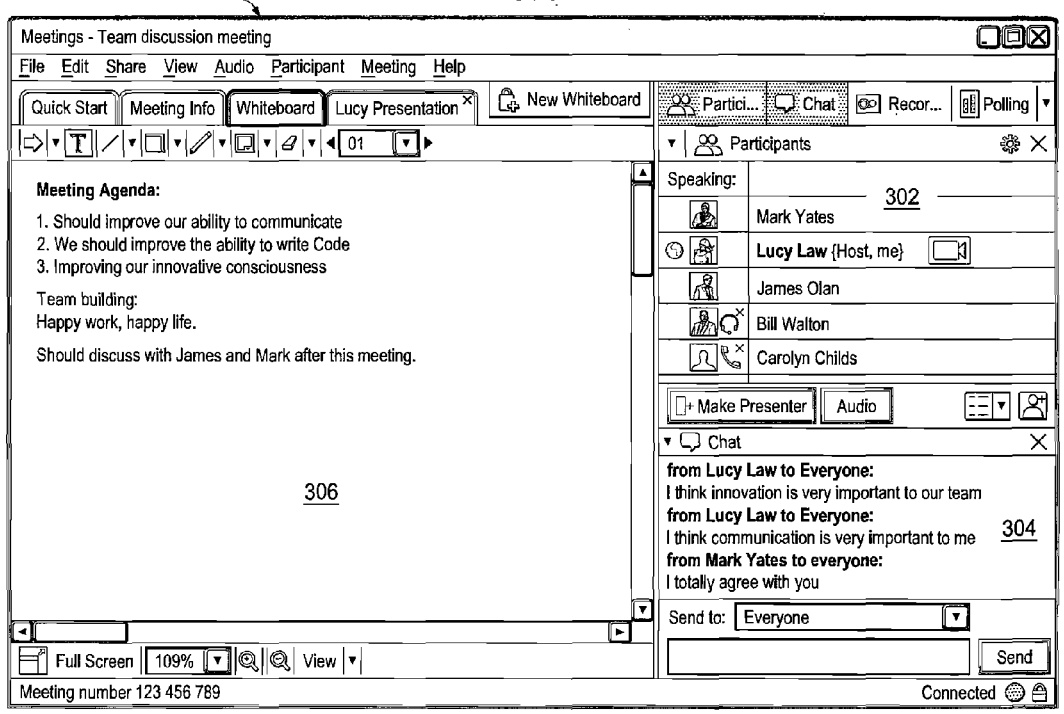

FIG. 3A is an illustration showing an example user interface representation 300 associated with a meeting client according to at least one example embodiment. The example of FIG. 3 shows representation 300 with respect to a meeting client user interface. In at least one embodiment, representation 300 shows a various meeting information associated with an established online meeting including a participants list 302 identifying a number of meeting attendees, a chat window 304 providing text chat capabilities among meeting attendees, and a whiteboard 306 currently displaying a meeting agenda. In the illustrated embodiment, once the topics of discussion of the current meeting are completed by the invited attendees of the current meeting, the meeting host may wish to continue to discussion of the meeting topics with subset of the attendees of the original meeting.

Figure 3B:
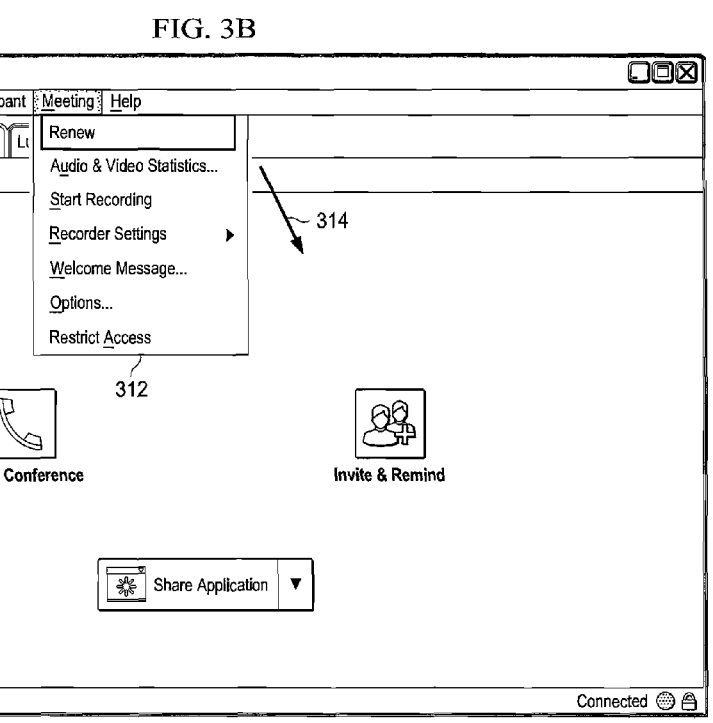

FIG. 3B is an illustration showing an example user interface representation 310 associated with the meeting client according to at least one example embodiment. In the representation 310, the meeting host selects an in-process meeting menu list 312 and clicks a renew meeting selection option 314 without requiring the host to end the current meeting in order to initiate a renewed meeting action within the current meeting to set up a subsequent meeting with a subset of the current meeting participants. In still other embodiments, a "Renew" button may be placed anywhere within representation 310.

FIG. 3C is an illustration showing an example user interface representation 316 associated with the meeting client according to at least one embodiment. In the representation 316, after the meeting host clicks the "renew" option, a "renew meeting settings" dialog popup 318 is displayed that includes a meeting topic input box 320, a meeting invitation area 322, a message content box 324, a meeting password input box 326, and a meeting recording option area 328. Meeting topic input box 320 allows a host to input an updated meeting topic for the renewed meeting. Allowing the host to provide an updated meeting topic may be useful if the host want to focus of the renewed meeting on a topic that is different from the topic of the previous meeting. Current meeting attendees are listed in meeting invitation area 322 by default. The meeting host may remove individual attendees from meeting invitation area 322 and/or drag meeting attendees to meeting invitation area 322 from participant list 302. In particular embodiments, if the meeting system is integrated with a company's Lightweight Directory Access Protocol (LDAP), meeting invitation area 322 may be configured to support an auto-complete contact feature. Upon renewal of the meeting, the meeting attendees within meeting invitation area 322 will be invited to participate in the renewed meeting with the meeting host.

Message content box 324 allows the host to enter a message to be sent to the meeting attendees within a meeting invite message. Meeting password input box 326 allows the meeting host to optionally assign a new password for the renewed meeting to be sent to the invitees of the renewed meeting. A new password may be to ensure that a meeting join link associated with the previous meeting cannot be used to join the renewed meeting. If an unwanted attendee from the previous meeting attempts to join the renewed meeting using the join link for the previous meeting, it may be rejected by the meeting system. Meeting recording option area 328 may include a check box labeled "Record meeting in a new file" which in some embodiments may be selected by default. If the checkbox is checked, the later meeting content will be recorded in a new file by recording server 106. In particular embodiments, the new recording file may be made only visible to the attendees for the new meeting. If the check box is not checked, recording server 106 may keep using the meeting record file for the new meeting and append the new meeting content to the meeting record file. It will be helpful if host doesn't want to record old meeting content and new meeting content in one recording file.

Representation 316 may further include a "send message" button 330. When the meeting host clicks "send message" button 330, the meeting attendees listed in meeting invitation area 322 may receive an invite message as will be further described with respect to FIG. 3D. Representation 316 may further include a "Renew" button 332. After the meeting host clicks the "Renew" button 332, the meeting is renewed. After renewal of the meeting, the meeting host and selected attendees can continue the meeting without having to quit the previous meeting and the context of the previous meeting including certain content associated with the previous meeting, such as shared information and chat, is still made available to attendees of the renewed meetings. During the renewed meeting, the meeting host may invite one or more additional attendees through meeting invitation area 322. If the invited attendees are not currently participating in the meeting, application server 102 may send meeting invitation emails to the targeted attendees. In a particular embodiment, if a user tries to join the meeting again using the previous join link, the user interface may be configured to display to the user that the meeting has ended or that the meeting is not available.

Figure 3D:
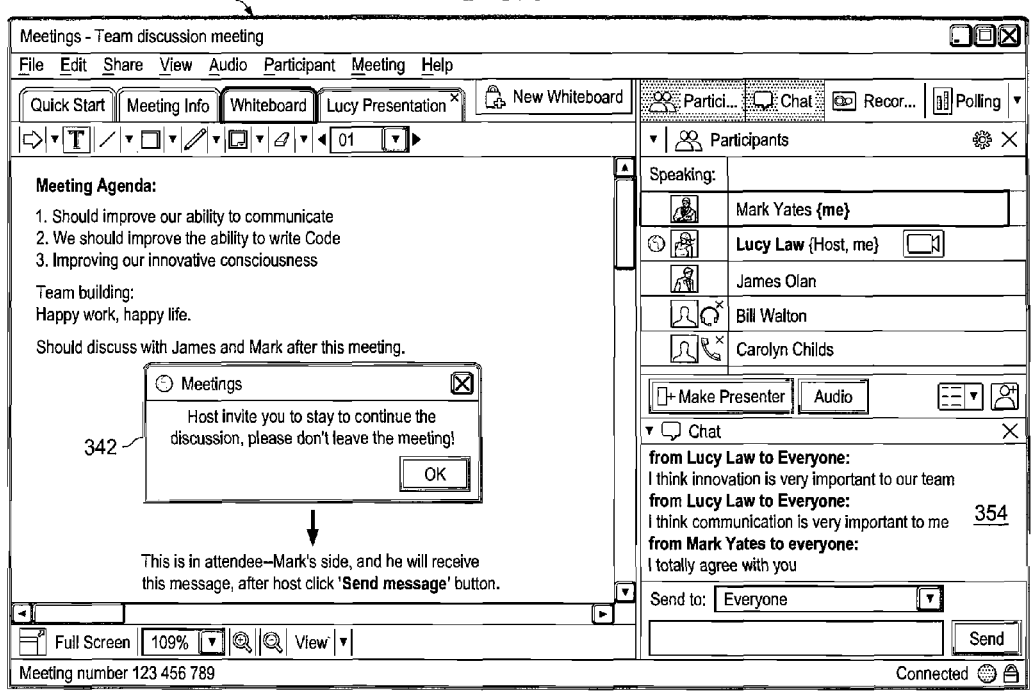

FIG. 3D is an illustration showing an example user interface representation 340 associated with the meeting client according to at least one embodiment. The representation 340 describes an example of a user interface for a meeting attendee that has received a meeting invitation for the renewed meeting. The representation 340 includes an attendee invite message 342 indicating to the user that the user has been invited to participate in the renewed meeting that is sent to the user after the meeting clicks the "send message" button 330.

Figure 3E:
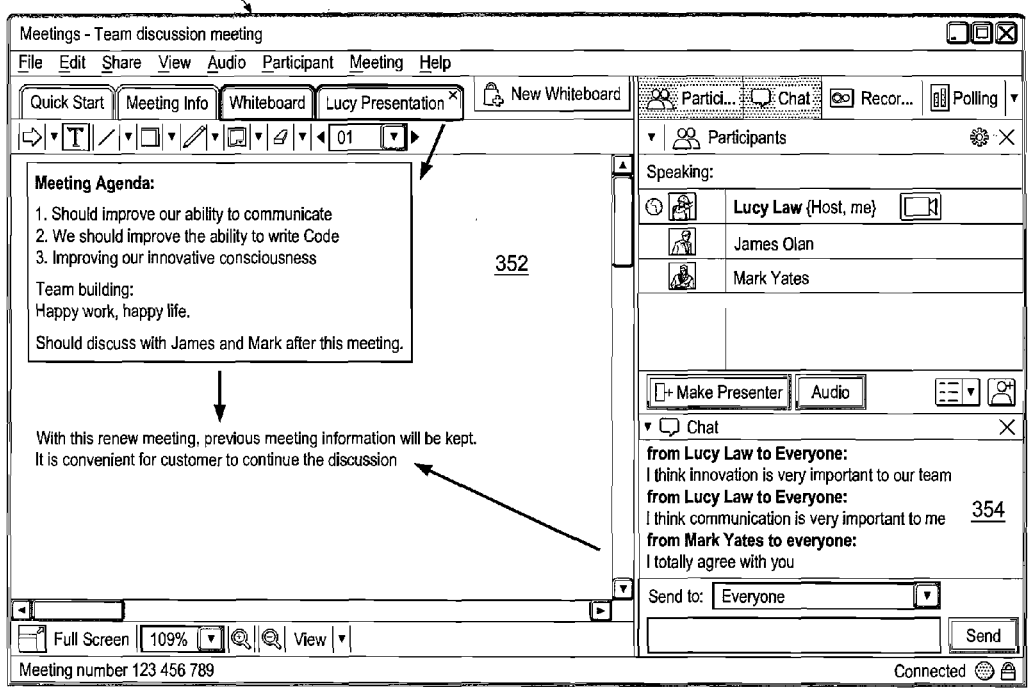

FIG. 3E is an illustration showing an example user interface representation 350 associated with the meeting client according to at least one embodiment. In representation 350, a subset of the attendees of the previous meeting, Mark and James, are shown in the meeting participant list. In addition, previous meeting contextual information including whiteboard information 352 and chat information 354 from the previous meeting is retained within representation 350. The retaining of certain contextual information from the previous meeting allows participants to more efficiently continue additional discussions regarding previously presented information.

One or more embodiments described herein may provide for one or more advantages such as eliminating the need for a meeting host to reschedule a new meeting in order to save time, providing the capability of a meeting host to force unwanted attendees to quit a meeting to provide greater security, allowing a meeting host to record the renewed meeting in a new recording file to avoid mixing of content with the old recording file, and allowing the meeting host to change the meeting password so that a previous meeting join link is no longer functional in order to enhance security.

Figure 4:
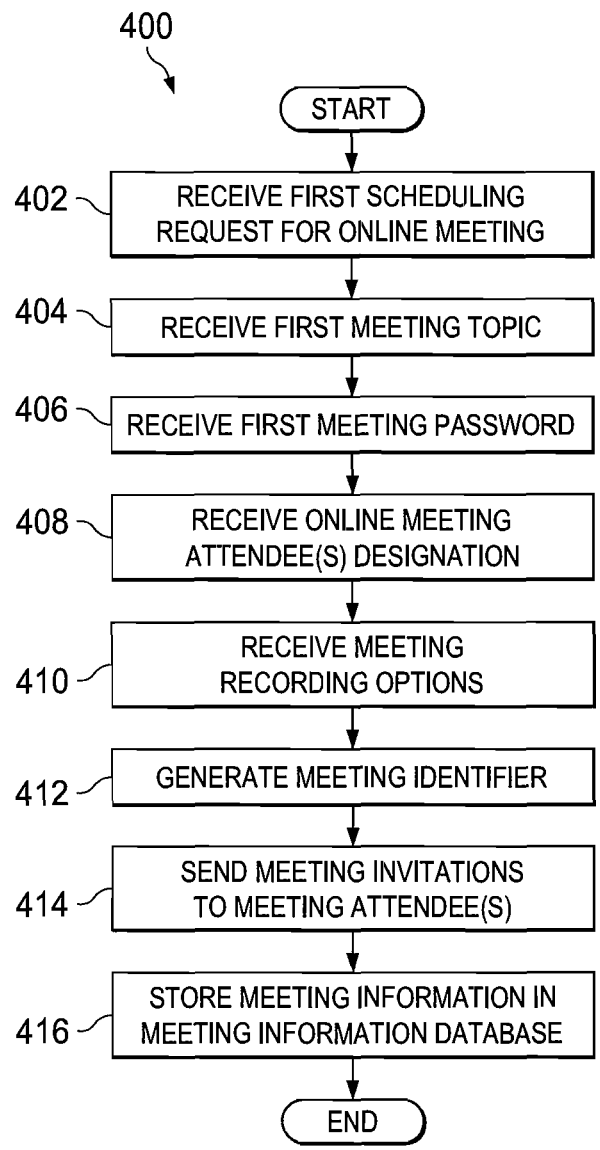
FIG. 4 is a simplified flowchart illustrating a potential operation of the application server associated with the present disclosure.

FIG. 4 is a simplified flowchart 400 illustrating a potential operation of application server 102 associated with the present disclosure. In the embodiment illustrated in FIG. 4, a meeting host associated with first client device 110a initiates an online meeting by accessing application server 102 to schedule the online meeting. In a particular example, the meeting host may initiate an online meeting with application server 102 using a meeting client configured on first client device 110a. In still another example, the meeting host may initiate an online meeting with application server 102 using a browser application. In 402, application server 102 receives a first scheduling request to initiate scheduling for an online meeting from first client device 110a. In still other embodiments, the meeting host may use a computer or device other than first client device 110a to schedule the online meeting with application server 102. In various embodiments, the first scheduling request includes a time and date of the scheduled meeting indicative of when the meeting host desires for the meeting to take place. In still other embodiments, the first scheduling request may include an expected duration or end time of the online meeting.

In 404, application server 102 receives a first meeting topic associated with the online meeting from the meeting host. The meeting topic may include a textual description of the intended focus of the online meeting to be displayed to attendees during the online meeting. In 406, application server 102 receives a first meeting password from the meeting host. In one or more embodiments, application server 102 may be configured to require a meeting attendee to enter the first meeting password in order to allow the meeting attendee to connect to and participate in the scheduled online meeting. In at least one embodiment, the meeting host may choose the first meeting password that will be associated with the scheduled online meeting. In still other embodiments, the meeting host may allow application server 102 to generate a random or pseudo-random password to be used for the online meeting.

In 408, application server 102 receives a designation of the one or more online meeting attendees that will be invited to participate in the scheduled online meeting. In various embodiments, the meeting attendees may be selected from a list of possible attendees by the meeting host and/or entered manually by the meeting host. In 410, application server 102 receives meeting recording options for the online meeting. The meeting recording options may include an indication chosen by the meeting host of whether the online meeting is to be recorded once the scheduled meeting commences at the scheduled time. In addition, in at least one embodiment the meeting host may be given the capability to initiate and/or stop recording of the online meeting during the progress of the meeting.

In 412, application server 102 generates a meeting identifier (ID) to be associated with and identify the online meeting. In 414, application server 102 sends meeting invitations to each of the invited meeting attendees designated by the meeting host. The meeting invitations may include the meeting time and date, the first meeting topic, the meeting password, a list of invited meeting attendees, and/or a link to allow a meeting attendee to connect to the online meeting at the scheduled date and time. In at least one embodiment, the link is a URL containing a link to a network address from which the meeting attendee can connect to the online meeting. In a particular embodiment, application server 102 may send meeting invitations to each of the meeting attendees by sending an electronic mail to a network address associated with each of the meeting attendees. In 416, application server 102 stores meeting information associated with the scheduled meeting in meeting information database 108. In particular embodiments, the meeting information may include one or more of the scheduled data/time of the meeting, the meeting ID associated with the meeting, the first meeting topic information, the first meeting password, invited meeting attendees information, and recording options associated with the online meeting. The operations then end.

Figure 5A:
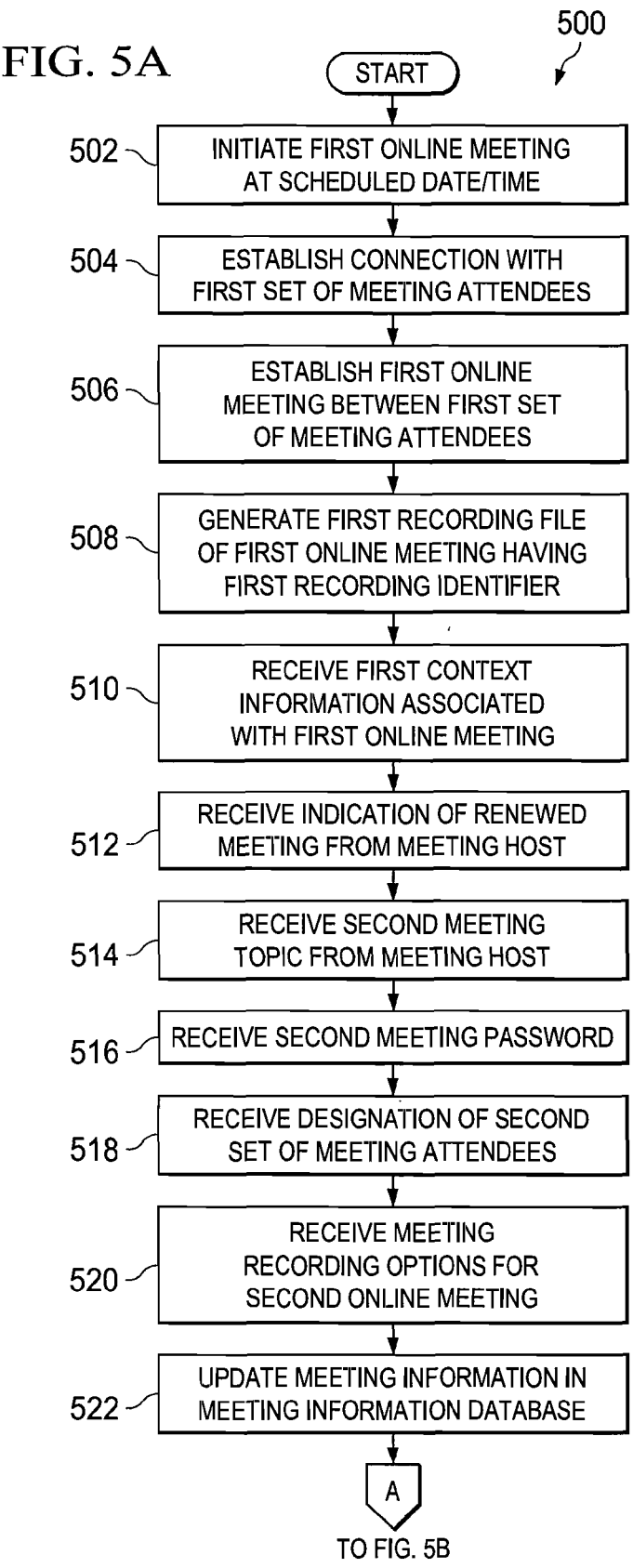
FIGS. 5A-5B are a simplified flowchart illustrating a potential operation for renewing an in-process meeting without interruption associated with the present disclosure.
Figure 5B:
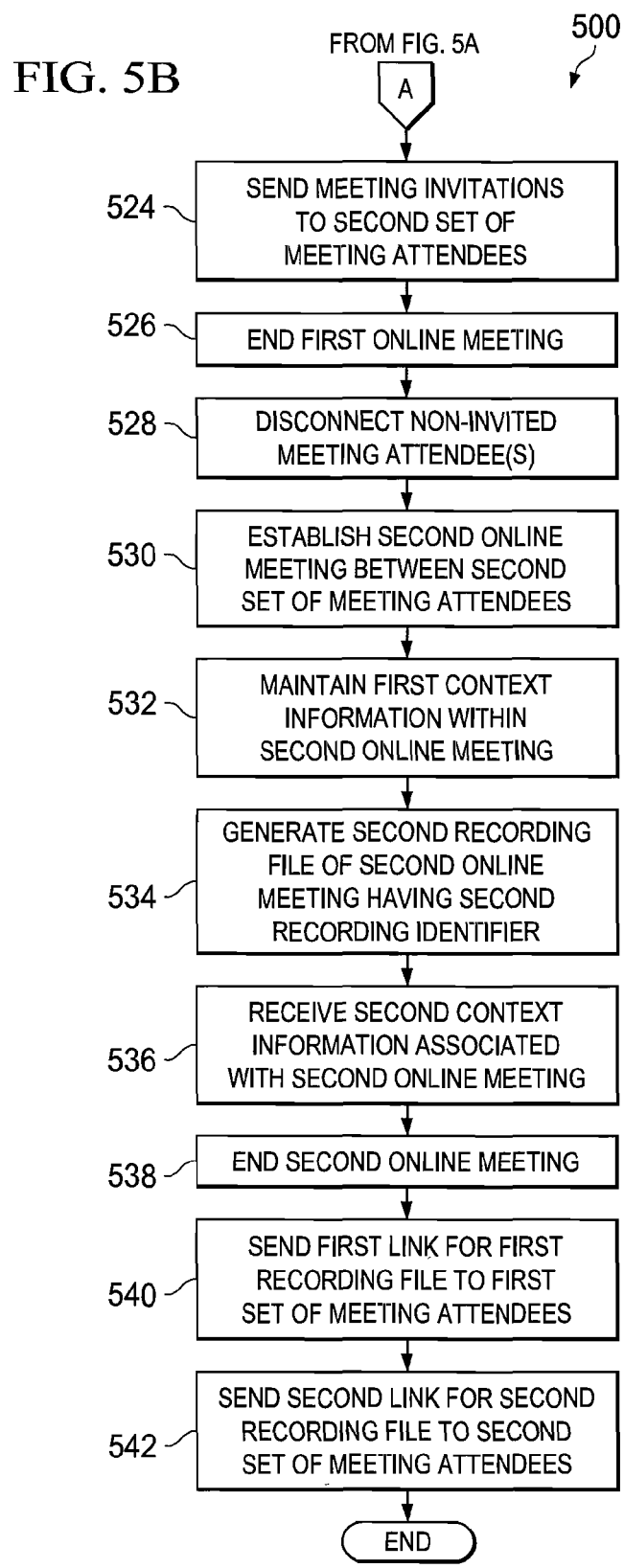

FIGS. 5A-5B are a simplified flowchart 500 illustrating a potential operation for renewing an in-process meeting without interruption associated with the present disclosure. The operations of FIG. 5 illustrate operations in which a meeting host may renew a first online meeting in order to establish a second online meeting. In 502, meeting and media server 104 initiates a first online meeting at a scheduled date and time. In one or more embodiments, a meeting host schedules the first online meeting for the scheduled date and time with application server 102 using a procedure such as that described with respect to FIG. 4. During scheduling of the first online meeting, the meeting host designates a first set of endpoints associated with meeting attendees to participate in the first online meeting. In a particular embodiment, meeting and media server 104 retrieves the meeting information associated with the first online meeting from database 108. In 504, meeting and media server 104 establishes a connection with each of the first set of endpoints associated with meeting attendees. In one or more embodiments, meeting and media server 104 establishes a connection with a meeting attendee by receiving a connection request including a first password associated with the first online meeting from a client device associated with the meeting attendee. In 506, meeting and media server 104 establishes the first online meeting between the first set of endpoints associated with meeting attendees. In one or more embodiments, the first online meeting has a meeting identifier (ID) associated with the first online meeting. In at least one embodiment, the meeting ID is generated by application server 102.

In 508, application server 102 instructs recording server 106 to generate a first recording file of the first online meeting having a first recording identifier (ID) associated with the first recording file. In a particular embodiment, the first recording ID is generated by application server 102. In still another embodiment, the first recording ID may be generated by meeting and media server 104 or recording server 106. In one or more embodiments, recording server 106 records online meeting record information, such as audio information, video information and/or meeting context information, received from meeting and media server 104, and stores the recorded online meeting record information within meeting recording database 238. In 510, meeting and media server 104 receives first context information associated with the first online meeting from at least one of the first set of endpoints associated with meeting attendees. The first context information includes information shared between the first set of endpoints associated with meeting attendees during the first online meeting. In particular embodiments, the shared information may include one or more of whiteboard information, chat information, or other information shared between meeting attendees during the first online meeting.

In 512, application server 102 receives an indication of the desire to establish a renewed meeting, i.e., second online meeting, after conclusion of the first meeting from the meeting host. In 514, application server 102 may optionally receive a second meeting topic from the meeting host to be associated with the second online meeting. In 516, application server receives a second meeting password associated with the second online meeting. In 518, application server 102 receives a designation of a second set of endpoints associated with meeting attendees from the meeting host representative of the meeting attendees that the meeting host wishes to participate in the renewed meeting. In at least one embodiment, the second set of endpoints associated with meeting attendees is a subset of the first set of endpoints associated with meeting attendees. In a particular embodiment, a meeting client of first client device 110a may be configured to present the meeting host with a list of meeting attendees of the first online meeting in a GUI and allow the meeting host to select the individual meeting attendees from the list that the meeting host wishes to invite to participate in the second online meeting. In still other embodiments, the meeting client may provide the meeting host with the capability of manually entering meeting attendees for the second online meeting. In 520, application server 102 receives meeting recording options for the second online meeting from the meeting host. The meeting recording options may include an indication chosen by the meeting host of whether the second online meeting is to be recorded once the second online meeting begins.

In 522, application server 102 updates the meeting information associated with the meeting ID in the meeting information database 238 with the meeting information associated with the second online meeting. In 524, application server 102 sends meeting invitations to each of the members of the second set of endpoints associated with meeting attendees designated by the meeting host. The meeting invitations may the second meeting topic, the second meeting password, a list of second set of endpoints associated with meeting attendees, and/or a meeting link to allow a meeting attendee to connect to the second online meeting. In at least one embodiment, the link is a URL containing a link to a network address from which the meeting attendee can connect to the second online meeting. In a particular embodiment, the meeting invitation may be displayed to the meeting attendee within a meeting client. In still another particular embodiment, application server 102 may send meeting invitations to each of the meeting attendees by sending an electronic mail to a network address associated with each of the meeting attendees. It should be understood that the meeting link may be used in some embodiments in the case in which a member of the second set of endpoints associated with meeting attendees becomes disconnected from the first online meeting but still desires to participate in the second online meeting.

In 526, the first online meeting is ended. In at least one embodiment, the first online meeting ended by the meeting host. In still other embodiments, the first online meeting may be ended after the scheduled duration for the first online meeting has elapsed. In 528, meeting and media server 104 disconnects the non-invited meeting attendees from the first online meeting. The non-invited meeting attendees are meeting attendees of the first online meeting that have not been invited by the meeting host to participate in the second online meeting. In 532, meeting and media server 104 establishes a second online meeting between the second set of endpoints associated with meeting attendees without disconnecting at least one of the first set of endpoints associated with meeting attendees. In one or more embodiments, the second online meeting has the same meeting identifier as the first online meeting. In 532, meeting and media server 104 maintains the first context information so that it may remain available to the second set of endpoints associated with meeting attendees within the second meeting.

In 534, application server 102 instructs recording server 106 to generate a second recording file of the second online meeting having a second recording identifier (ID) associated with the second recording file. In a particular embodiment, the second recording ID is generated by application server 102. In still another embodiment, the second recording ID may be generated by meeting and media server 104 or recording server 106. In one or more embodiments, recording server 106 records online meeting record information, such as audio information, video information and/or meeting context information, received from meeting and media server 104 in association with the second online meeting, and stores the recorded online meeting record information within meeting recording database 238. In 536, meeting and media server 104 receives second context information associated with the second online meeting from one or more of the second set of endpoints associated with meeting attendees. The second context information may include information shared between meeting participants during the second online meeting such as whiteboard information or chat information. In 538, the second online meeting ends. In 540, application server 102 may send a first link for accessing the first recording file to the first set of endpoints associated with meeting attendees. In 542, application server 102 may send a second link for accessing the second recording file to the second set of endpoints associated with meeting attendees. The operations then end.

Note that in certain example implementations, the meeting service functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols (e.g., IGP, IGMP, etc.), communication system 100 may be applicable to other protocols and arrangements. Moreover, the present disclosure is equally applicable to various technologies, aside from DSL architectures, as these have only been offered for purposes of discussion. Along similar lines, communication system 100 can be extended to any Multi-Protocol Label Switching (MPLS) architecture. Similarly, the teachings presented herein can also be used in loop free alternate (LFA) configurations in other embodiments.

Additionally, although communication system 100 has been illustrated with reference to particular elements and operations that facilitate the communication process, these elements and operations may be replaced by any suitable architecture or process that achieves the intended functionality of communication system 100.

What is claimed is:

1. A method, comprising:
    establishing a connection with each of a first set of endpoints associated with a first set of meeting attendees;
    establishing a first online meeting between the first set of endpoints associated with the first set of meeting attendees, the first online meeting having a meeting identifier associated therewith;
    generating a first recording file of the first online meeting, the first recording file having a first recording identifier associated therewith;
    receiving first context information associated with the first online meeting from at least one of the first set of endpoints associated with the first set of meeting attendees;
    sending a meeting invitation for a second online meeting to at least one of a second set of endpoints associated with a second set of meeting attendees, wherein the second set of endpoints associated with the second set of meeting attendees is a subset of the first set of endpoints associated with the first set of meeting attendees;
    ending the first online meeting;
    storing the first recording file in association with the meeting identifier and the first recording identifier;
    disconnecting each of the first set of endpoints that are associated with the first set of meeting attendees that are non-invited to the second online meeting;
    establishing the second online meeting between the second set of endpoints associated with the second set of meeting attendees without disconnecting at least one of the first set of endpoints associated with the first set of meeting attendees, the second online meeting having the same meeting identifier as the first online meeting associated therewith;

maintaining the first context information within the second online meeting such that the first context information remains available to the second set of endpoints;

generating a second recording file of the second online meeting, the second recording file having a second recording identifier associated therewith;

storing the second recording file in association with the meeting identifier and the second recording identifier;

sending a first link for accessing the first recording file to the first set of endpoints associated with the first set of meeting attendees; and sending a second link for accessing the second recording file to the second set of endpoints associated with the second set of meeting attendees.

2. The method of claim 1, wherein sending the meeting invitation includes sending the meeting invitation to the at least one of the second set of endpoints associated with the second set of meeting attendees without disconnecting from at least one of the first set of endpoints associated with the first set of meeting attendees.

3. The method of claim 1, further comprising:
sending a first password associated with the first online meeting to the first set of endpoints associated with the first set of meeting attendees; and
sending a second password associated with the second online meeting to the second set of endpoints associated with the second set of meeting attendees.

4. The method of claim 1, wherein the first context information includes information shared between the first set of endpoints associated with the first set of meeting attendees during the first online meeting.

5. The method of claim 4, wherein the shared information includes at least one of whiteboard information and chat information.

6. The method of claim 1, further comprising receiving second context information associated with the second online meeting from at least one of the second set of endpoints associated with the second set of meeting attendees.

7. Logic encoded in one or more non-transitory tangible media that includes code for execution and when executed by a processor operable to perform operations comprising:
establishing a connection with each of a first set of endpoints associated with a first set of meeting attendees;
establishing a first online meeting between the first set of endpoints associated with the first set of meeting attendees, the first online meeting having a meeting identifier associated therewith;
generating a first recording file of the first online meeting, the first recording file having a first recording identifier associated therewith;
receiving first context information associated with the first online meeting from at least one of the first set of endpoints associated with the first set of meeting attendees;
sending a meeting invitation for a second online meeting to at least one of a second set of endpoints associated with a second set of meeting attendees, wherein the second set of endpoints associated with the second set of meeting attendees is a subset of the first set of endpoints associated with the first set of meeting attendees;
ending the first online meeting;
storing the first recording file in association with the meeting identifier and the first recording identifier;
disconnecting each of the first set of endpoints that are associated with the first set of meeting attendees that are non-invited to the second online meeting;
establishing the second online meeting between the second set of endpoints associated with the second set of meeting attendees without disconnecting at least one of the first set of endpoints associated with the first set of meeting attendees, the second online meeting having the same meeting identifier as the first online meeting associated therewith;
maintaining the first context information within the second online meeting such that the first context information remains available to the second set of endpoints;
generating a second recording file of the second online meeting, the second recording file having a second recording identifier associated therewith;
storing the second recording file in association with the meeting identifier and the second recording identifier;
sending a first link for accessing the first recording file to the first set of endpoints associated with the first set of meeting attendees; and
sending a second link for accessing the second recording file to the second set of endpoints associated with the second set of meeting attendees.

8. The media of claim 7, wherein sending the meeting invitation includes sending the meeting invitation to the at least one of the second set of endpoints associated with the second set of meeting attendees without disconnecting from at least one of the first set of endpoints associated with the first set of meeting attendees.

9. The media of claim 7, wherein the operations further comprise:
sending a first password associated with the first online meeting to the first set of endpoints associated with the first set of meeting attendees; and
sending a second password associated with the second online meeting to the second set of endpoints associated with the second set of meeting attendees.

10. The media of claim 7, wherein the first context information includes information shared between the first set of endpoints associated with the first set of meeting attendees during the first online meeting.

11. An apparatus, comprising:
a memory element configured to store data,
a processor operable to execute instructions associated with the data, and
a meeting services module, the apparatus being configured to:
establish a connection with each of a first set of endpoints associated with a first set of meeting attendees;
establish a first online meeting between the first set of endpoints associated with the first set of meeting attendees, the first online meeting having a meeting identifier associated therewith;
generate a first recording file of the first online meeting, the first recording file having a first recording identifier associated therewith;
receive first context information associated with the first online meeting from at least one of the first set of endpoints associated with the first set of meeting attendees;
send a meeting invitation for a second online meeting to at least one of a second set of endpoints associated with a second set of meeting attendees, wherein the second set of endpoints associated with the second set of meeting attendees is a subset of the first set of endpoints associated with the first set of meeting attendees;
end the first online meeting;
store the first recording file in association with the meeting identifier and the first recording identifier;
disconnect each of the first set of endpoints that are associated with the first set of meeting attendees that are non-invited to the second online meeting;
establish the second online meeting between the second set of endpoints associated with the second set of meeting attendees without disconnecting at least one of the first set of endpoints associated with the first set of meeting attendees, the second online meeting having the same meeting identifier as the first online meeting associated therewith;
maintain the first context information within the second online meeting such that the first context information remains available to the second set of endpoints;
generate a second recording file of the second online meeting, the second recording file having a second recording identifier associated therewith;
store the second recording file in association with the meeting identifier and the second recording identifier;
send a first link for accessing the first recording the to the first set of endpoints associated with the first set of meeting attendees; and
send a second link for accessing the second recording file to the second set of endpoints associated with the second set of meeting attendees.

12. The apparatus of claim 11, wherein the first context information includes information shared between the first set of endpoints associated with the first set of meeting attendees during the first online meeting.

13. The apparatus of claim 12, wherein the shared information includes at least one of whiteboard information and chat information.

14. An endpoint, comprising:
a graphical user interface;
a processor; and
a memory coupled to the processor, wherein the endpoint is configured for:
initiating a first online meeting involving a first set of endpoints associated with a first set of meeting attendees;
receiving a meeting identifier associated with the first online meeting;
initiating generating of a first recording file of the first online meeting, the first recording file having a first recording identifier associated therewith, wherein the first recording file is stored in association with the meeting identifier and the first recording identifier;
receiving first context information associated with the first online meeting from at least one of the first set of endpoints associated with the first set of meeting attendees;
sending a meeting invitation for a second online meeting to at least one of a second set of endpoints associated with a second set of meeting attendees, wherein the second set of endpoints associated with the second set of meeting attendees is a subset of the first set of endpoints associated with the first set of meeting attendees, wherein the first online meeting is ended, each of the first set of endpoints that are associated with the first set of meeting attendees that are non-invited to the second online meeting are disconnected, and the second online meeting is established between the second set of endpoints associated with the second set of meeting attendees without disconnecting at least one of the first set of endpoints associated with the first set of meeting attendees, the second online meeting having the same meeting identifier as the first online meeting associated therewith;
maintaining the first context information within the second online meeting such that the first context information remains available to the second set of endpoints; and
initiating generating of a second recording file of the second online meeting, the second recording file having a second recording identifier associated therewith, wherein the second recording file is stored in association with the meeting identifier and the second recording identifier;
sending a first link for accessing the first recording file to the first set of endpoints associated with the first set of meeting attendees; and
sending a second link for accessing the second recording file to the second set of endpoints associated with the second set of meeting attendees.

15. The endpoint of claim 14, wherein the graphical user interface of the endpoint is configured for:
rendering one or more images associated with the first online meeting on the endpoint for viewing by a user of the endpoint, wherein at least some of the one more images are associated with participant lists for the first online meeting and the second online meeting.

16. The endpoint of claim 14, wherein the endpoint is further configured for:
triggering a renew option for the first online meeting such that the first online meeting extends past its scheduled time.

17. The endpoint of claim 14, wherein the endpoint is further configured for:
notifying at least one of the first set of endpoints to remain connected to the first online meeting after reaching an end of a scheduled time for the first online meeting.

18. The endpoint of claim 14, wherein the endpoint is further configured for:
pruning at least some of the first set of endpoints associated with the first set of meeting attendees for the first online meeting such that a subset of the first set of endpoints is able to access the second online meeting.

19. The endpoint of claim 14, wherein the endpoint is further configured for:
sharing at least one of whiteboard information and chat information with the first set of endpoints associated with the first set of meeting attendees during the first online meeting and the second set of endpoints associated with the second set of meeting attendees during the second online meeting.

* * * * *